United States Patent
Bai et al.

(10) Patent No.: US 11,129,170 B2
(45) Date of Patent: Sep. 21, 2021

(54) METHODS AND SYSTEMS FOR PROTECTING HIGH PRIORITY SYMBOLS FROM BEAM SWITCHING

(71) Applicant: QUALCOMM Incorporated, San Diego, CA (US)

(72) Inventors: Tianyang Bai, Bridgewater, NJ (US); Juergen Cezanne, Ocean Township, NJ (US); Navid Abedini, Somerset, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/293,203

(22) Filed: Mar. 5, 2019

(65) Prior Publication Data
US 2019/0349949 A1   Nov. 14, 2019

Related U.S. Application Data

(60) Provisional application No. 62/669,897, filed on May 10, 2018.

(51) Int. Cl.
*H04W 72/08*   (2009.01)
*H04W 72/04*   (2009.01)
(Continued)

(52) U.S. Cl.
CPC ........ *H04W 72/085* (2013.01); *H04B 7/0413* (2013.01); *H04B 7/0695* (2013.01);
(Continued)

(58) Field of Classification Search
CPC . H04W 72/0446; H04W 84/12; H04W 84/18; H04W 28/04; H04W 28/06
(Continued)

(56) References Cited

U.S. PATENT DOCUMENTS 10,757,540 B1 *   8/2020   Klinkner ............... H04W 4/022
2012/0082038 A1 *   4/2012   Xu ........................ H04L 5/0044
370/244
(Continued)

FOREIGN PATENT DOCUMENTS

EP   3334070 A1   6/2018
JP   WO2017022422 A1 *   8/2015   .............. H04J 11/00
WO   2017022422 A1   2/2017

OTHER PUBLICATIONS

3GPP TSG RAN WG1 Meeting #90bis, R1-1717866, Prague, P.R. Czech Oct. 9-13, 2017, Agenda Item: 7.2.2.3, Source Lenovo, Motorola Mobility, Title: Discussion of beam management and reporting (Year: 2017).*

(Continued)

*Primary Examiner* — Peter G Solinsky
*Assistant Examiner* — Sanjay K Dewan
(74) *Attorney, Agent, or Firm* — Changwoo Yang

(57) ABSTRACT

Certain aspects of the present disclosure provide techniques for protecting high priority symbols from beam switching. In some aspects, a method comprises identifying potential beam switching time spots in a time interval. The method further comprises determining a time interval configuration of the time interval based on the identified potential beam switching time spots, wherein the time interval configuration protects one or more high priority symbols from beam switching at the potential beam switching time spots. The method further comprises transmitting the time interval configuration to a user equipment (UE).

30 Claims, 13 Drawing Sheets

(51) Int. Cl.
*H04W 72/10* (2009.01)
*H04B 7/06* (2006.01)
*H04B 7/0413* (2017.01)
*H04L 5/00* (2006.01)

(52) U.S. Cl.
CPC .......... *H04L 5/0048* (2013.01); *H04L 5/0053* (2013.01); *H04W 72/0446* (2013.01); *H04W 72/10* (2013.01)

(58) Field of Classification Search
USPC ........................................................ 370/336
See application file for complete search history.

(56) References Cited

U.S. PATENT DOCUMENTS

| | | | |
|---|---|---|---|
| 2014/0019609 A1* | 1/2014 | Williams | H04L 43/028 709/224 |
| 2019/0215701 A1* | 7/2019 | Honglei | H04W 16/28 |

OTHER PUBLICATIONS

3GPP TSG RAN WG1 Meeting 90bis, R1-1717812, Prague, CZ, Oct. 9-13, 2017, Source: CATT, Title: Consideration on beam management, Agenda Item: 7.2.2.3. (Year: 2017).*

3GPP TSG-RAN WG4 NR AH#3, R4-1709652, Nagoya, Japan, Sep. 18-21, 2017, Agenda item: 3.4.2.1, Source: ZTE, Title: Discussion on beam switching speed for range2 NR BS. (Year: 2017).*

Catt: "Consideration on Beam Management", 3GPP Draft; R1-1717812, 3rd Generation Partnership Project (3GPP), Mobile Competence Centre, 650, Route Des Lucioles; F-06921 Sophia-Antipolis Cedex, France, vol. RAN WG1, No. Prague, CZ; Oct. 9, 2017-Oct. 13, 2017, Oct. 8, 2017 (Oct. 8, 2017), 10 Pages, XP051340997, Retrieved from the Internet: URL: http://www.3gpp.org/ftp/Meetings_3GPP_SYNC/RAN1/Docs/ [retrieved on Oct. 8, 2017], Section 2.2, Section 2.2.1.3, Section 2.2.2, Section 2.3.

International Search Report and Written Opinion—PCT/US2019/020939—ISA/EPO—dated May 17, 2019.

Lenovo., et al., "Discussion of Beam Management and Reporting", 3GPP Draft; R1-1717866_Beam_Management, 3rd Generation Partnership Project (3GPP), Mobile Competence Centre, 650, Route Des Lucioles; F-06921 Sophia-Antipolis Cedex, France, vol. RAN WG1, No. Prague, P.R. Czech; Oct. 9, 2017-Oct. 13, 2017, Oct. 8, 2017 (Oct. 8, 2017), 4 Pages, XP051341050, Retrieved from the Internet: URL: http://www.3gpp.org/ftp/Meetings_3GPP_SYNC/RAN1/Docs/ [retrieved on Oct. 8, 2017], Section 1, Section 2.1.

ZTE: "Discussion on Beam Switching Speed for Range2 NR BS", 3GPP Draft; R4-1709652, 3rd Generation Partnership Project (3GPP), Mobile Competence Centre, 650, Route Des Lucioles; F-06921 Sophia-Antipolis Cedex, France, vol. RAN WG4, No. Nagoya, Japan; Sep. 18, 2017-Sep. 21, 2017, Sep. 17, 2017 (Sep. 17, 2017), 3 Pages, XP051344781, Retrieved from the Internet: URL: http://www.3gpp.org/ftp/Meetings_3GPP_SYNC/RAN4/Docs/ [retrieved on Sep. 17, 2017], Section 2.

* cited by examiner

METHODS AND SYSTEMS FOR PROTECTING HIGH PRIORITY SYMBOLS FROM BEAM SWITCHING

CROSS-REFERENCE TO RELATED APPLICATIONS

This application claims the benefit of and priority to U.S. application Ser. No. 62/669,897 entitled "METHODS AND SYSTEMS FOR PROTECTING HIGH PRIORITY SYMBOLS FROM BEAM SWITCHING," which was filed May 10, 2018. The aforementioned application is herein incorporated by reference in its entirety.

FIELD OF THE DISCLOSURE

Aspects of the present disclosure relate to wireless communications, and more particularly, to techniques for protecting high priority symbols from beam switching.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a base station (BS). The method generally includes identifying potential beam switching time spots in a time interval. The method also includes determining a time interval configuration of the time interval based on the identified potential beam switching time spots, wherein the time interval configuration protects one or more high priority symbols from beam switching at the potential beam switching time spots. The method also includes transmitting the time interval configuration to a user equipment (UE).

Certain aspects provide an apparatus, comprising a non-transitory memory comprising executable instructions and a processor in data communication with the memory and configured to execute the instructions to cause the apparatus to identify potential beam switching time spots in a time interval, determine a time interval configuration of the time interval based on the identified potential beam switching time spots, wherein the time interval configuration protects one or more high priority symbols from beam switching at the potential beam switching time spots, and transmit the time interval configuration to a user equipment (UE).

Certain aspects provide an apparatus, comprising a means for identifying potential beam switching time spots in a time interval, means for determining a time interval configuration of the time interval based on the identified potential beam switching time spots, wherein the time interval configuration protects one or more high priority symbols from beam switching at the potential beam switching time spots, and means for transmitting the time interval configuration to a user equipment (UE).

Certain aspects provide a method for wireless communication performed by a user equipment (UE). The method generally includes transmitting a beam switching capability of the UE to a base station (BS). The method also includes receiving a time interval configuration for a time interval from the BS, wherein the time interval configuration protects one or more high priority symbols from beam switching at potential beam switching time spots within the time interval. The method also includes transmitting or receiving the time interval with the time interval configuration.

Certain aspects provide an apparatus, comprising a non-transitory memory comprising executable instructions and a processor in data communication with the memory and configured to execute the instructions to cause the apparatus to transmit a beam switching capability of the apparatus to a base station (BS), receive a time interval configuration for a time interval from the BS, wherein the time interval configuration protects one or more high priority symbols from beam switching at potential beam switching time spots within the time interval, and transmit or receive the time interval with the time interval configuration.

Certain aspects provide an apparatus, comprising means for transmitting a beam switching capability of the apparatus to a base station (BS), means for receiving a time interval configuration for a time interval from the BS, wherein the time interval configuration protects one or more high priority symbols from beam switching at potential beam switching time spots within the time interval, and means for transmitting or receiving the time interval with the time interval configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
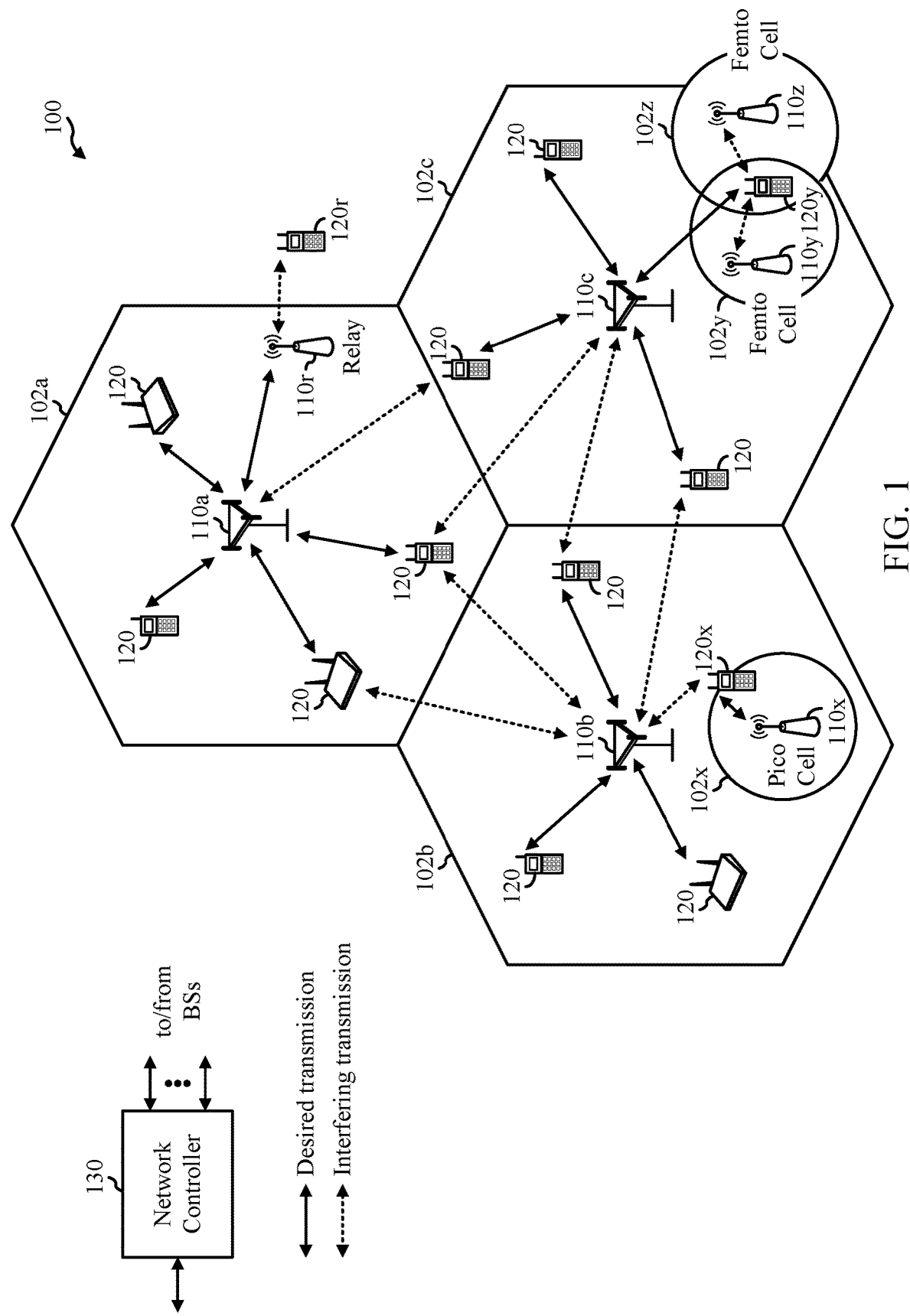
FIG. 1 is a block diagram conceptually illustrating an example telecommunications system, in accordance with certain aspects of the present disclosure.

Aspects of the present disclosure provide apparatus, methods, processing systems, and computer readable mediums relating to techniques for protecting high priority symbols from beam switching.

In directional beamforming, a wireless communication device may perform beam switching. Beam switching can be achieved by changing the configuration of one or more RF components of the wireless communication device. In certain cases, there is a delay from when beam switching is triggered to when the beam is actually switched (e.g., final settle time). If the beam switch time is too long, it may impact the circular structure of the channel matrix for CP-orthogonal frequency division multiplexing and result in a loss in the error vector magnitude (EVM) as well as lowering the decoding rate at the receiver. Accordingly, certain aspects described herein relate to protecting high priority symbols from beam switching. For example, a base station (BS) may be configured to identify potential beam switching time spots in a time interval (e.g., time slot). Having determined the potential beam switching time spots, the BS may determine a time interval configuration (e.g., pattern) to protect the high priority symbols from the impact of beam switching at the potential beam switching time spots.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. Also, base station (BS) 110 of FIG. 1 may perform operations 1000 of FIG. 10. In addition, UE 120 of FIG. 1 may perform operations 1200 of FIG. 12.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
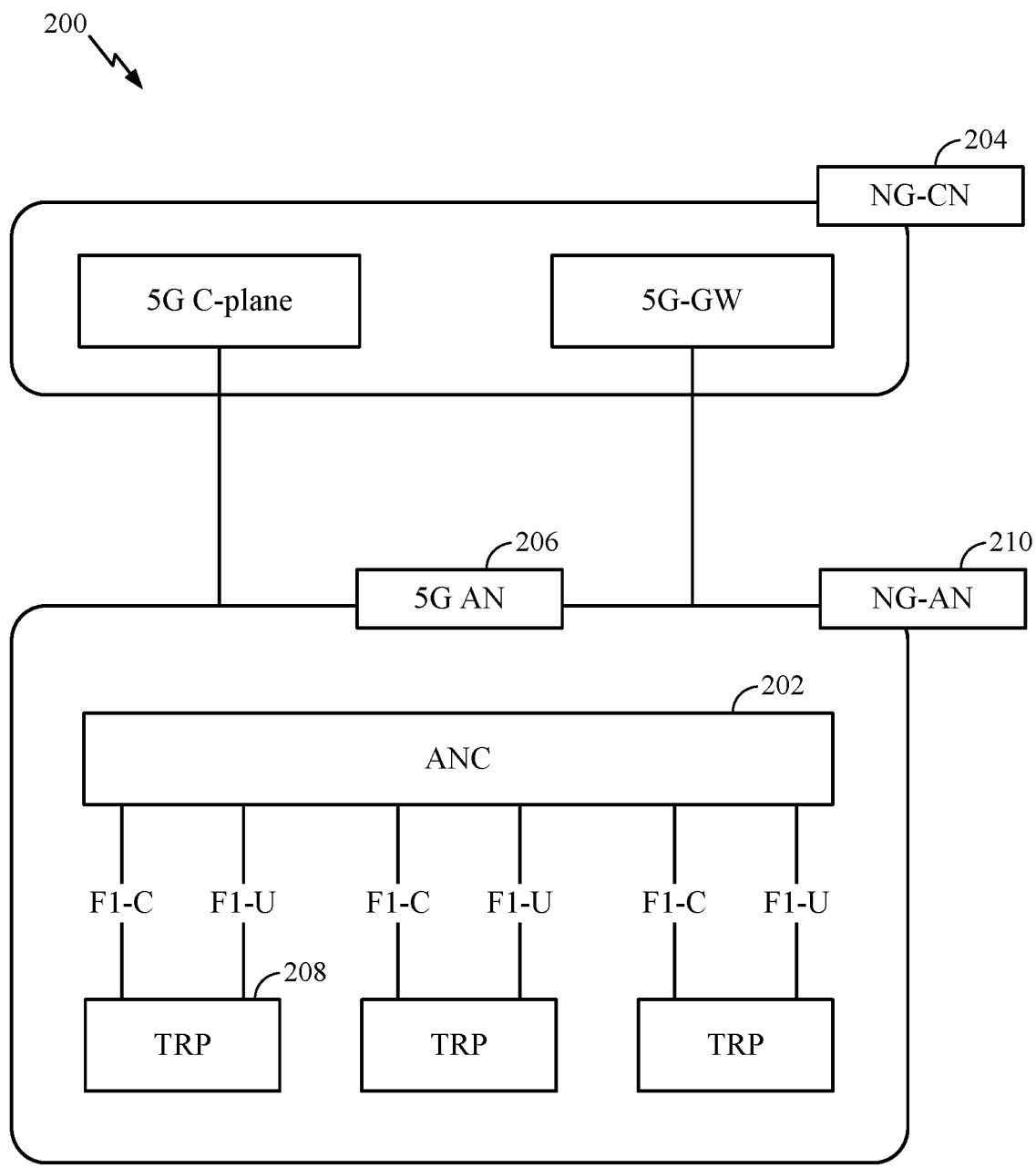
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
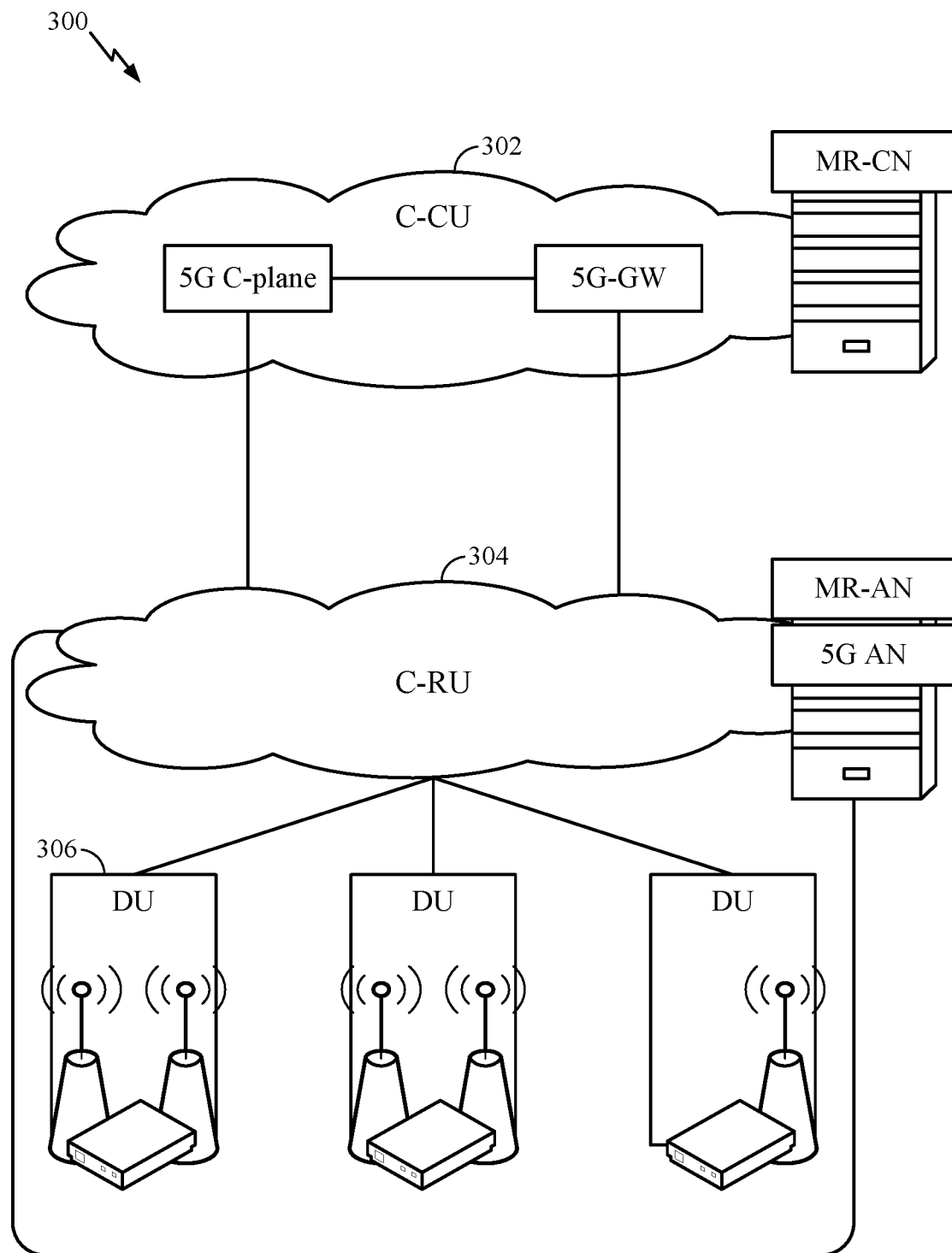
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
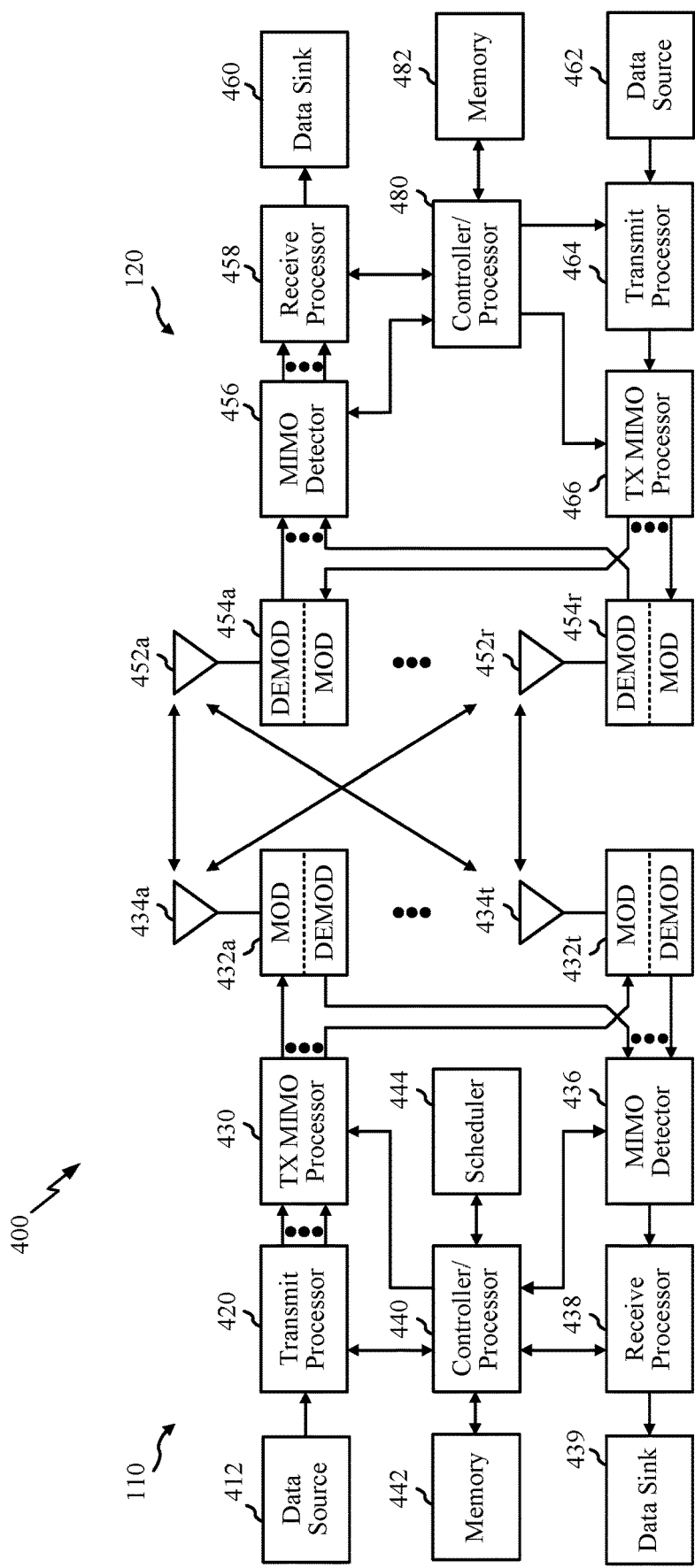
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein (e.g., operations 1000 of FIG. 10 and operations 1200 of FIG. 12).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. Also, the processor 480 and/or other processors and modules at the UE 120 may perform or direct the execution of processes for the techniques described herein (e.g., operations 1000 of FIG. 10 and operations 1200 of FIG. 12). The memories 442 and 482 may store data and program codes for BS 110 and UE 120, respectively. A scheduler 444 may schedule UEs for data transmission on the downlink and/or uplink.

Figure 5:
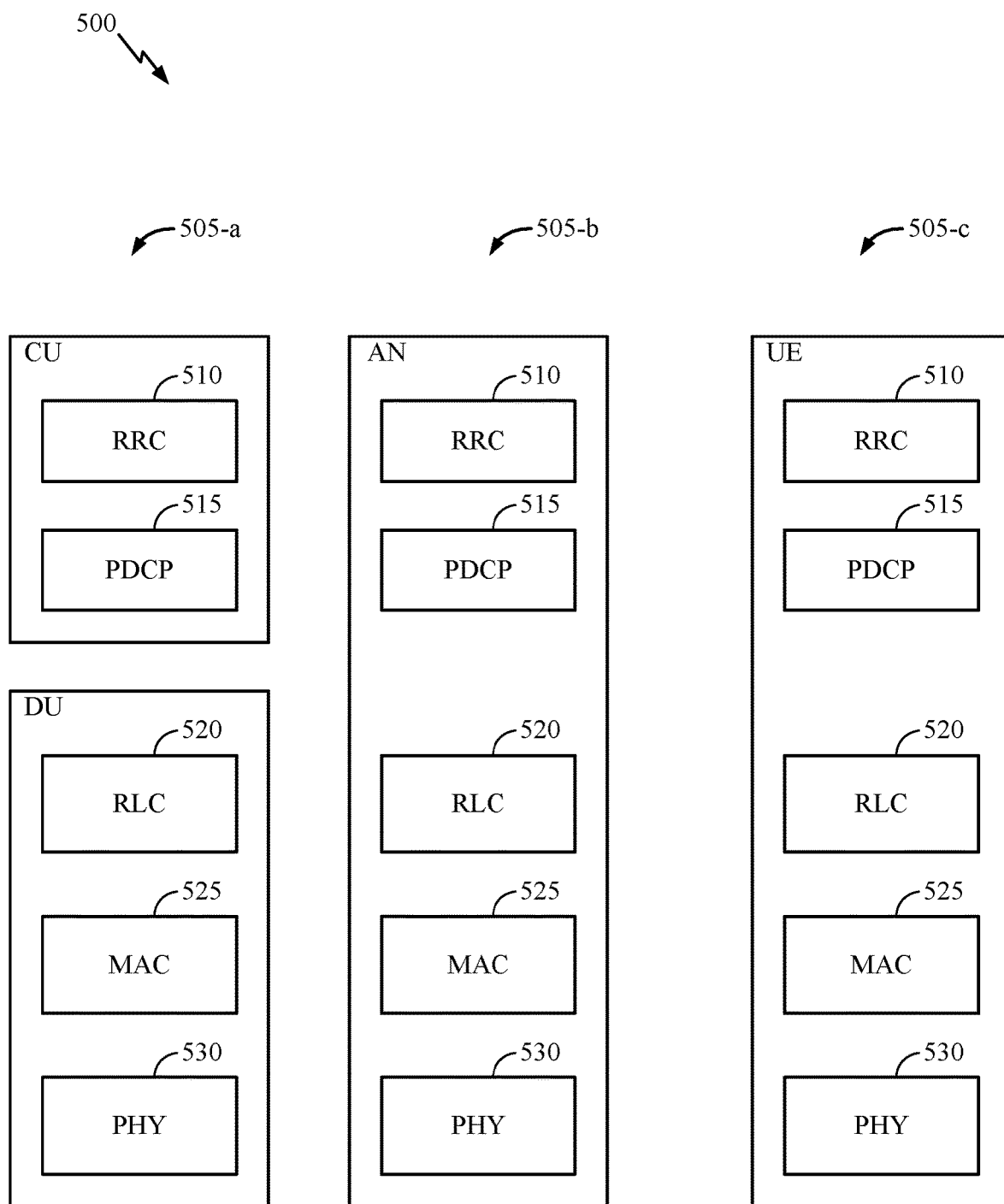
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
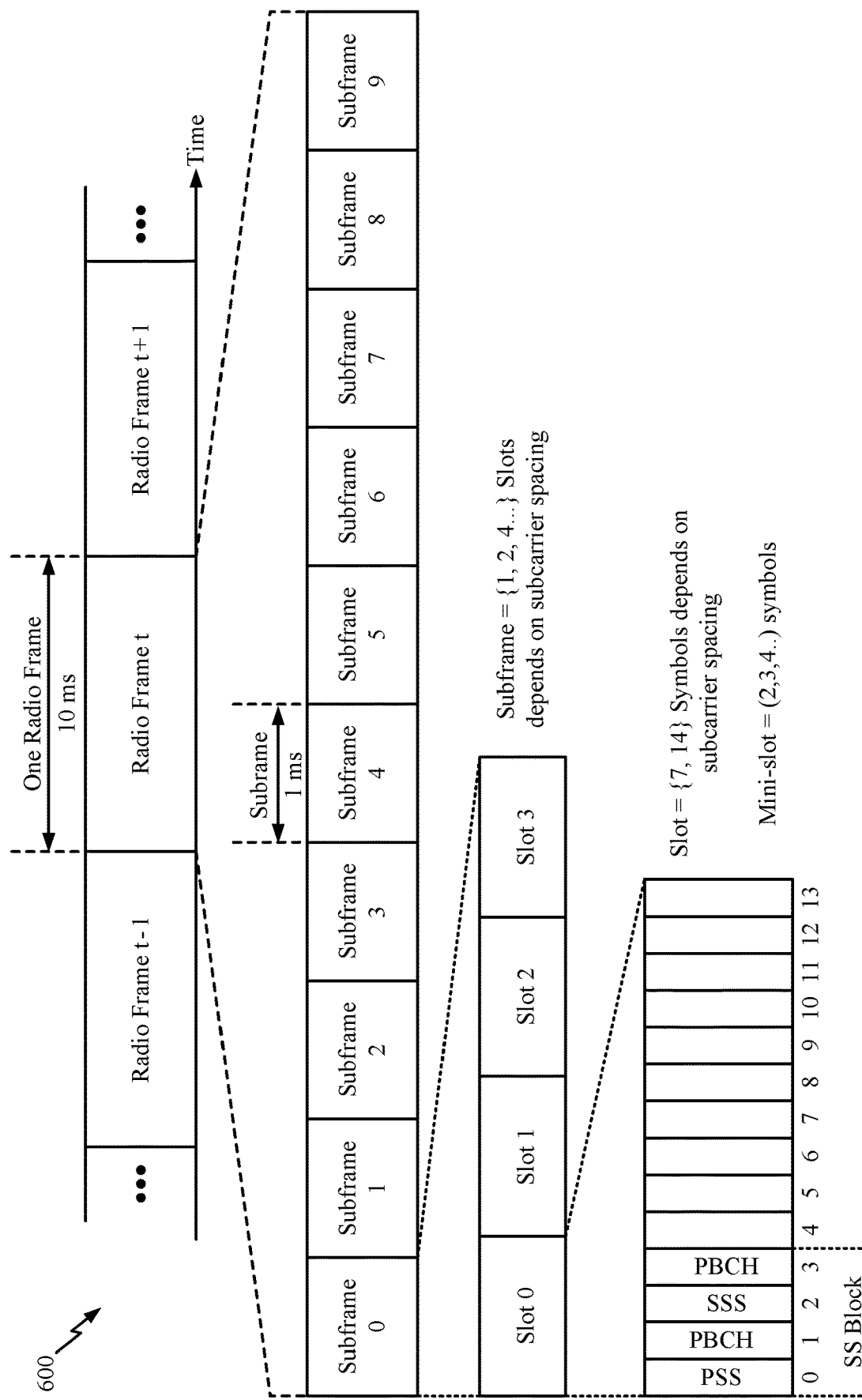
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beamforming

Millimeter wave (mmW) bands are being considered for 5G communications as they provide a large amount of bandwidth with potential for spatial re-use. However, as compared to operating in lower frequencies, mmW bands have high atmospheric attenuation and are subject to higher levels of absorption by atmospheric gases, rain, objects, etc., resulting in higher free space loss. But, due to the smaller wavelengths in mmW bands, antenna elements can be closely packed to form high-gain directional antenna arrays that can compensate for the high path loss. These phased antenna arrays can be used at each transmitter and receiver to create narrow beams and focus the signal energy towards a specific direction. An example of beam generation and alignment by wireless communication devices is shown in FIG. 7.

Figure 7:
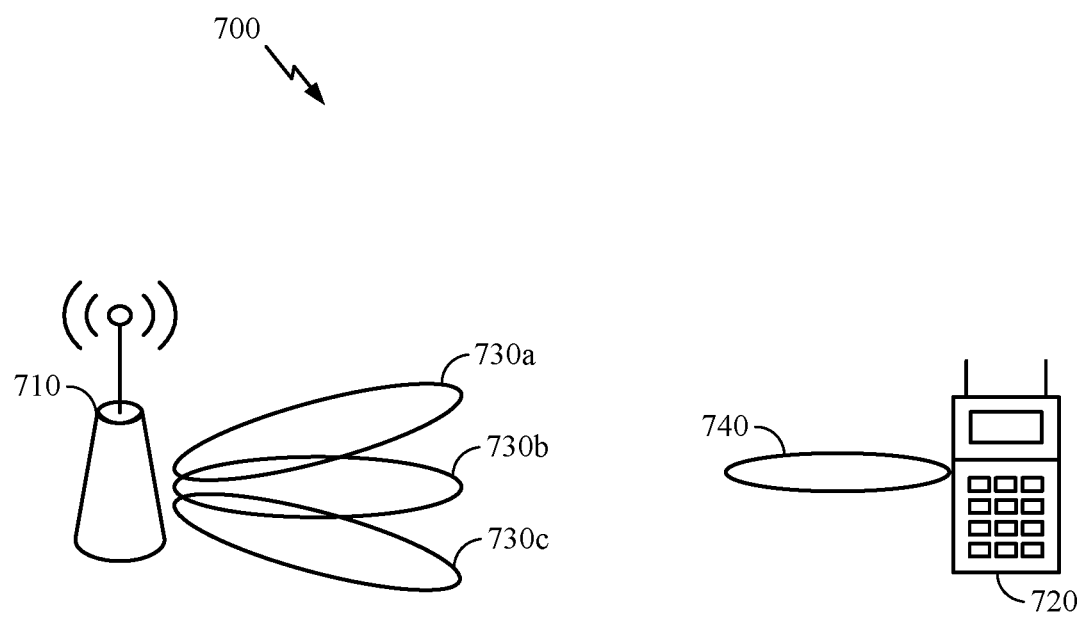
FIG. 7 illustrates an exemplary wireless communications system including a number of wireless communication devices engaging in beamforming, in accordance with certain aspects of the present disclosure.

FIG. 7 illustrates an exemplary wireless communications system 700, in accordance with certain aspects of the present disclosure. Wireless communications system 700 includes BS 710 (corresponding to BS 110) and UE 720 (corresponding to UE 120). To achieve high directional gain, the beam of the transmitter (e.g. BS) and the receiver (e.g. a UE) may be aligned precisely. For example, one of beams 730*a* through 730*c* propagated by the transmitter (e.g. AP 710) may intersect beam 740 propagated by the receiver (e.g. UE 720), or vice versa. The process of aligning beams propagated by the transmitter and the receiver is generally referred to as beamforming training.

The beam forming (BF) process is typically employed by a pair of millimeter-wave stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link is established.

In some cases, a wireless communication device may perform beam switching. Beam switching may be required for a variety of reasons. For example, as described above, during BF training, a wireless communication device (e.g., BS 710) may switch from beam to beam in a sector (e.g., beam sweeping) for transmitting reference signals, thereby, allowing other wireless communication devices to measure the reference signal received from each beam and select the best beam for pairing. Beam switching may also take place when different types of information are transmitted by a wireless communication device. For example, BS 710 may transmit control information (e.g., physical downlink control channel (PDCCH)) using beam 730*a* and then switch to beam 730*b* to transmit a data channel (e.g., physical downlink shared channel (PDSCH)). Another example where beam switching takes place is when a wireless communication device transitions from transmitting data to transmitting reference signals. For example, BS 710 may switch beams when transitioning from transmitting data to reference signals.

As described above, directional beamforming may be performed by analog radio frequency (RF) components in an analog circuit network or in a digital domain. Analog RF components include phase shifters, switches, etc.

Figure 8:
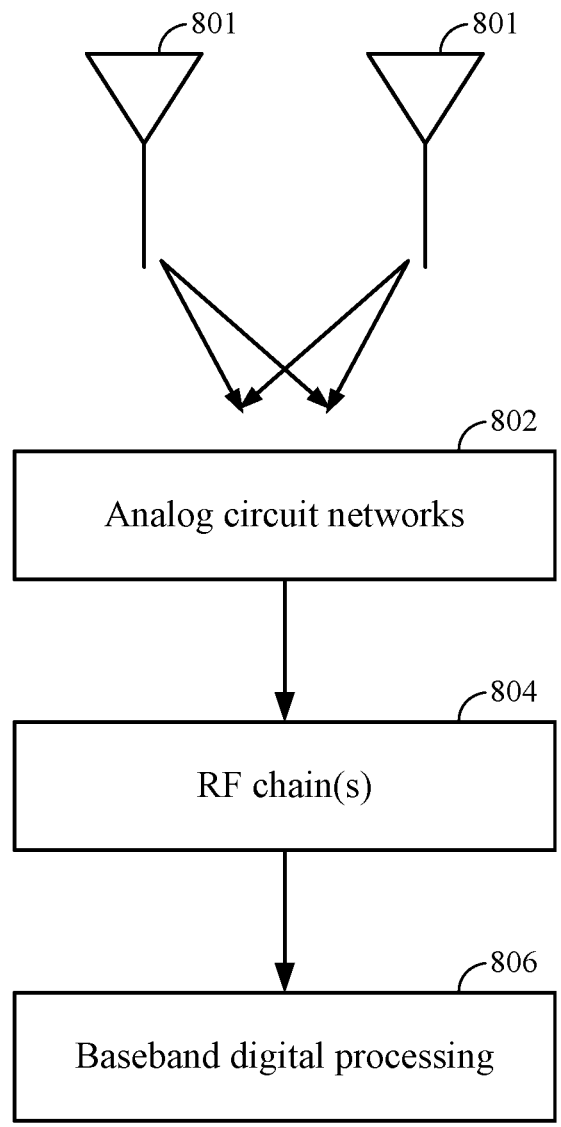
FIG. 8 illustrates example RF components of a wireless communication device that enable directional beamforming, in accordance with certain aspects of the present disclosure.

FIG. 8 illustrates example RF components of a wireless communication device that enable directional beamforming. For example, FIG. 8 illustrates antennas 801 (e.g., antennas 452 or antennas 434, shown in FIG. 4), analog circuit networks 802, RF chain(s) 804 (e.g., modulator/demodulator 454 or modulator/demodulator 432, shown in FIG. 4), and baseband digital processing 806 (e.g., receive processor 458 or receive processor 438, shown in FIG. 4). In some embodiments, beam switching can be achieved by changing the configuration of one or more of the RF components shown in FIG. 8. For example, in some embodiments, beam switching is performed by analog circuit networks 802 by changing the phase response of phase shifts provided by analog circuit networks 802 to antennas 801.

Figure 9:
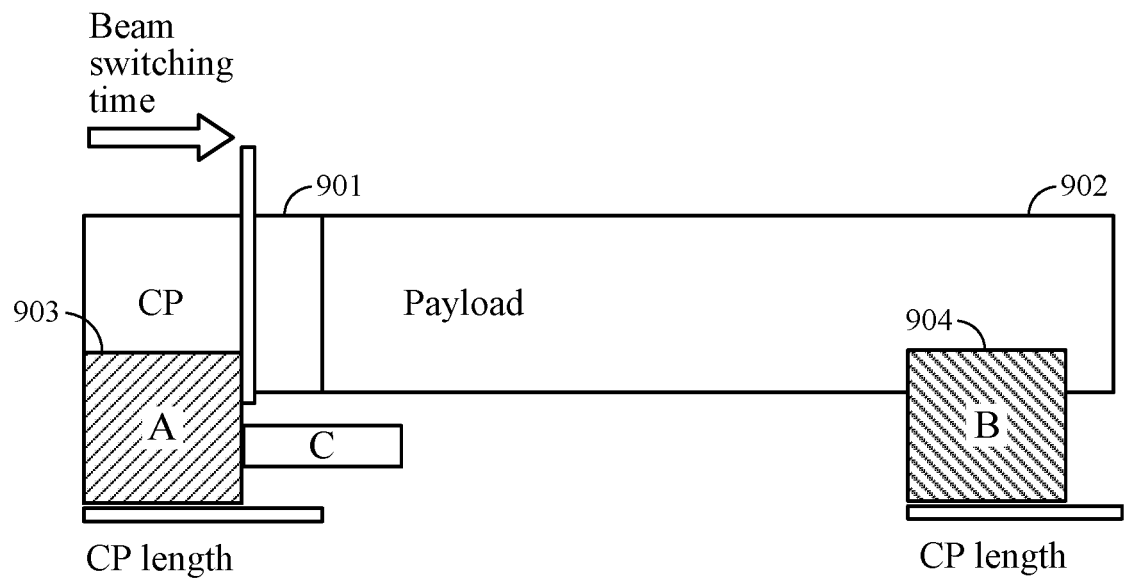
FIG. 9 illustrates an example of beam switching during the cyclic prefix period of a symbol, in accordance with certain aspects of the present disclosure.
Figure 9:
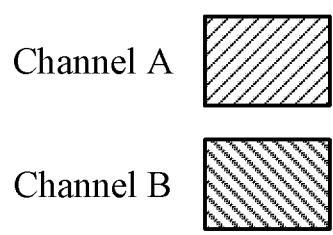

In some embodiments, there is a delay from when beam switching is triggered to when the beam is actually switched (e.g., final settle time). This may be referred to as the beam switch time. The beam switch time may typically be several hundred nanoseconds long. In some embodiments, beam switching may be performed during a cyclic prefix (CP) of a symbol. However, if the beam switch time is too long, it may impact the circular structure of the channel matrix for CP-orthogonal frequency division multiplexing and result in a loss in the error vector magnitude (EVM) as well as lowering the decoding rate at the receiver. EVM is a measure used to quantify the performance of a digital radio transmitter or receiver. In addition, during the beam switch time, the effective channel may be time-varying. FIG. 9 illustrates an example of beam switching during the CP of a symbol. FIG. 9 shows a time symbol 902, comprising a payload (e.g., also referred to as payload 902) that is preceded by CP 901. CP 901 is a copy of the end part of symbol 902. In the example of FIG. 9, beam switching takes place immediately at the start of CP 901 (e.g., beam switch time spot) and continues for some time. The length of the beam switch time of the beam switching of FIG. 9 is shown as beam switch time 903. On the transmitter side, if the aggregate of the beam switch time and the channel delay is longer than the length of CP 901, then a loss in the EVM as well as a lowering of the decoding rate at the receiver may result. This is because, similar to what is described above, if there is beam switching at the transmitter side, then the impact of the beam switch transition response will later propagate into certain time periods at the receiver, due to the delay tap of the channel response. For example, the beam switching may take 300 nanoseconds (ns) (e.g., beam switch time 903 is 300 ns) to complete, and the maximum length of the channel delay may be 200 ns. In that case, at the receiver, the impact of the beam switching may affect the received OFDM symbols for up to 300+200=500 ns, measured from the beam switch triggering point. If CP is shorter than 500 ns in this case, then the payload symbol portion is impacted.

FIG. 9 shows Channel A, which refers to a set of channel responses applied to samples sent during beam switch time 903, and channel B, which refers to a set of channel responses applied to samples sent during the time period 904. Hence Channel A has a length that is equal to the length of beam switch time 903 (the time duration measured from when beam switching is triggered to the completion of the beam switching). During beam switch time 903, the channel response is in a random transition time because of the beam switching, which has not completed yet.

If there is no beam switching, the channel response associated with Channel A's time duration should be identical to that of Channel B' time duration. If the start portion and end portion of payload 902 have the same channel response, then the effective channel matrix of payload 902 would be a circulant matrix. However, if there is beam switching, the effective channel matrix of payload 902 would not have a circulant matrix structure. For example, if the length of Channel A is longer than CP 901, then Channel A's time duration overlaps with payload 902. In that case, the random transition response associated with Channel A's time duration will affect the starting samples in payload 902, which breaks the circulant matrix structure.

Also, even if the beam switch time is shorter than the length of CP 901, the beam switching at the transmit side may also affect the circulant matrix structure, as the impact of the beam switching during channel A's time duration may propagate into a later time (e.g., into payload 902) due to the multi-path channel delay. For example, if the beam switching time (which equals the length of channel A) plus the maximum channel delay length (which equals the length of time duration C) is longer than the length of CP 901, the impact of the beam switching may affect the received signal in payload 902, resulting in breaking the circulant matrix structure, which leads to a worse EVM and decoding performance.

In some cases, the impact of beam switching is different on different types of symbols. For example, the impact of an EVM loss may be much higher on a demodulation reference signal (DMRS) than a data symbol. More specifically, the impact of an EVM loss on a DMRS symbol may include the corruption of the channel estimation and the propagation of decoding errors to all symbols. In contrast, the impact of an EVM loss on a data symbol may include only a local impact. Generally, certain symbols have a lower modulation coding scheme (MCS) rate and are, therefore, more resistant to an EVM loss. Accordingly, certain embodiments described herein relate to protecting high priority symbols from the potential impact of beam switching (e.g., EVM loss and low decoding rates) when the beam switch time is long.

Example of Protecting High Priority Symbols from Beam Switching

Figure 10:
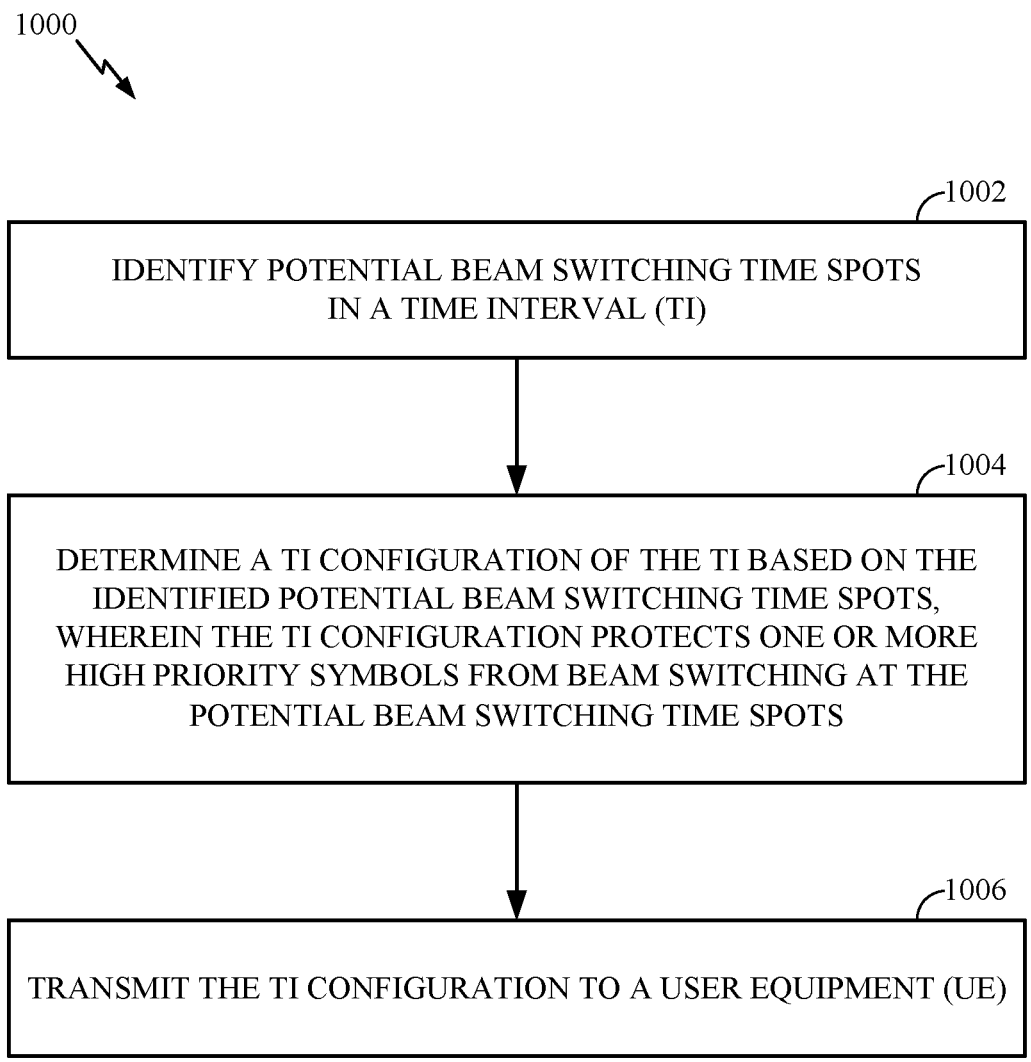
FIG. 10 illustrates example operations performed by a base station, according to aspects of the present disclosure.

FIG. 10 illustrates example operations 1000 performed by a base station (e.g., BS 110), according to aspects of the present disclosure. Operations 1000 begin, at 1002, by identifying potential beam switching time spots in a time interval.

As described above, when the beam switch time is long, the impact of beam switching on certain symbols is higher than others. These symbols are hereinafter referred to as high priority symbols. Examples of high priority symbols include DMRS and channel state information reference signals (CSI-RS) used for channel quality indicator (CQI), precoding matrix indicator (PMI), and rank indicator measurements. Unlike high priority signals, beam switching may only have a local or limited impact on other symbols, which may hereinafter be referred to as low priority symbols. In some embodiments, beam switching may also include a change of a transmission configuration indicator (TCI) beam of the transmission. In one example, a TCI identifies a base station beam, such that the UE is able to determine which base station beam it should expect to receive in the downlink based on a certain TCI.

In some embodiments, if high priority symbols are placed (e.g., scheduled for transmission) immediately after when a wireless communication device may potentially switch beams (e.g., potential beam switching time spot) in a time slot, the resulting EVM loss from the beam switching may have a very high impact on the high priority symbols, as described above.

As a result, the BS may be configured to identify potential beam switching time spots in a time interval (e.g., time slot). Having determined the potential beam switching time spots, the BS may determine a time interval configuration (e.g., pattern) to protect the high priority symbols from the impact of beam switching at the potential beam switching time spots, as further described in relation to steps 1004 and 1006.

At 1004, the BS determines a time interval configuration of the time interval based on the identified potential beam switching time spots, wherein the time interval configuration protects one or more high priority symbols from beam switching at the potential beam switching time spots.

In some embodiments, determining a time interval configuration may include refraining from placing one or more high priority symbols immediately after one or more of the identified beam switching spots in the time interval. As such, the BS may first determine the priority of symbols within the time interval, which includes identifying a number of high priority symbols among symbols scheduled for transmission in the time interval. As described above, high priority symbols may include DMRS and CSI-RS. As an example, if the BS determines that a potential beam switching time spot is at the beginning of the second symbol of a time interval, then the BS may refrain from placing DMRS for transmission in the second symbol. Instead, DMRS may be placed in the third symbol. In some embodiments, determining the time interval configuration may also include refraining from placing one or more high priority symbols immediately before one or more of the identified beam switching spots in the time interval. Ensuring that high priority symbols are not placed immediately after and/or before the potential beam switching time spots helps reduce or eliminate the impact of beam switching and ISI on the high priority symbols, thereby protecting the high priority symbols.

In some embodiments, it may not be possible to refrain from placing high priority symbols immediately before and/or after the potential beam switching time spots. In such embodiments, determining a time interval configuration may include placing additional high priority symbols (e.g., copies of the high priority symbols) after the potential beam switching time spots in the time interval. As an example, two DMRS symbols may be placed next to each other. In other words, an additional or a second DMRS symbol may be placed right next to a first DMRS symbol (e.g., DMRS symbol that is placed immediately after the potential beam switching time spot(s)) without any gaps in between them. In such an example, if the first DMRS symbol is corrupted or experiences ISI because of beam switching, then the second DMRS symbol may be used for decoding. In another example, a second DMRS symbol may be placed after the first DMRS symbol but not right next to it. In other words, there may be a time gap between the first DMRS symbol and the second DMRS symbol. Placing one or more additional high priority symbols in a time interval increases the reliability of the communication in the time interval.

In some embodiments, determining a time interval configuration may depend on the beam switching capability of the UE (e.g., UE 120). For example, if the UE has a high beam switching capability, then the beam switch time may be very low, in which case the symbols right after the beam switching time spots may not be impacted by beam switching. In such an example, the BS may not utilize the techniques described above (e.g., refraining from placing high priority symbols right after potential beam switching time spots and placing additional high priority symbols in the time slot after the potential beam switching time spot(s)).

For example, in different situations, the CP may have different lengths. In some situations, the CP may have a normal length and in other situations CP may have an extended length. If the extended CP is used for the symbol after the beam switching, and the length of the extended CP is longer than the beam switching time plus the channel delay, then beam switching will cause no additional EVM loss. Then, in such a case, the base station may put high priority symbols immediately after the beam switching occurs, in certain embodiments. Otherwise, for example, if the CP has a normal length, and the CP length is not sufficiently long (e.g., longer than the beam switching time plus the channel delay), then the base station may refrain from putting high priority symbols after the beam switching time spot, in certain embodiments.

In some embodiments, the UE may transmit an indication to the BS indicative of the UE's beam switching capability, based on which the BS may then determine the time interval configuration. If the indication indicates that the UE has a low beam switching capability, then the BS may engage in steps 1002-1006 of operations 1000. If however, the indication indicates that the UE has a high beam switching capability, the BS may not engage in steps 1002-1006 of operations 1000.

In some embodiments, the beam switching capability of the UE may indicate the length of the UE's beam switch time. In some embodiments, the UE's beam switch time may refer to or be measured from the time when beam switching is triggered to when the UE's antenna array response settles down to a state that is close to a defined expected value. If the UE has a high beam switching capability, then its beam switch time is shorter. If the UE has a low beam switching capability, then its beam switch time is longer and, therefore, the impact of the beam switching may be higher on symbols placed after beam switching time spots.

In some embodiments, determining a time interval configuration of the time interval may include selecting a time interval configuration from a number of time interval configurations. For example, after identifying the potential beam switching time spots, the BS may select, from a set of possible time interval configurations, a time interval configuration where a high priority symbol does not immediately follow and/or precede a beam switch time spot in the time interval. In some embodiments, the BS may select a time interval configuration where additional high priority symbols are placed or scheduled for transmission after one or more of the potential beam switching time spots in the time interval. In some embodiments, the BS may select a time interval configuration where one or more gap periods are placed or scheduled for transmission before and/or after one or more of the potential beam switching time spots in the time interval.

At 1006, the BS transmits the time interval configuration to the UE (e.g., UE 120). In some embodiments, the time interval configuration may be transmitted to the UE using signaling. In some embodiments the signaling comprises a downlink control information (DCI) signaling, radio resource control (RRC) signaling, or a media access control element (MAC-CE) signaling.

In some embodiments, after the time interval configuration is transmitted to the UE, the BS may transmit or receive the time interval based on the time interval configuration.

Figure 11:
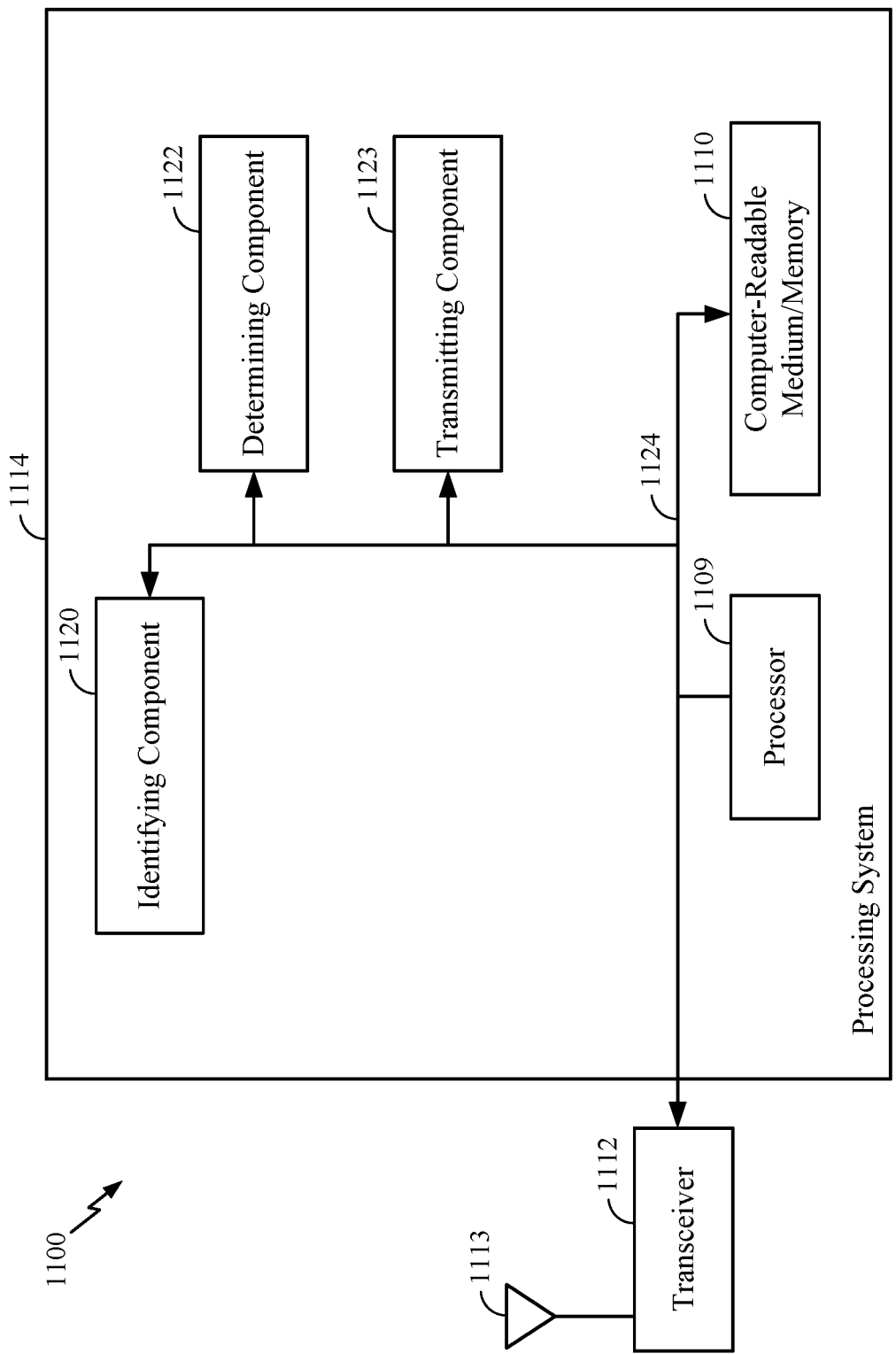
FIG. 11 illustrates a communications device that may include various components configured to perform operations for the techniques disclosed herein, such as one or more of the operations illustrated in FIG. 10.

FIG. 11 illustrates a communications device 1100 (i.e., BS 110) that may include various components (e.g., corresponding to means-plus-function components) configured to perform operations for the techniques disclosed herein, such as one or more of the operations illustrated in FIG. 10. The communications device 1100 includes a processing system 1114 coupled to a transceiver 1112. The transceiver 1112 is configured to transmit and receive signals for the communications device 1100 via an antenna 1113. The processing system 1114 may be configured to perform processing functions for the communications device 1100, such as processing signals, etc.

The processing system 1114 includes a processor 1109 coupled to a computer-readable medium/memory 1110 via a bus 1124. In certain aspects, the computer-readable medium/memory 1110 is configured to store instructions that when executed by processor 1109, cause the processor 1109 to perform one or more of the operations illustrated in FIG. 10, or other operations for performing the various techniques discussed herein.

In certain aspects, the processing system 1114 further includes an identifying component 1120 for performing one or more of the operations illustrated at 1002 in FIG. 10. Additionally, the processing system 1114 includes a determining component 1122 for performing one or more of the operations illustrated at 1004 in FIG. 10. Further, the processing system 1114 includes a transmitting component 1123 for performing one or more of the operations illustrated at 1006 in FIG. 10.

The identifying component 1120, the determining component 1122, and the transmitting component 1123 may be coupled to the processor 1109 via bus 1124. In certain aspects, the identifying component 1120, the determining component 1122, and the transmitting component 1123 may be hardware circuits. In certain aspects, the identifying component 1120, the determining component 1122, and the transmitting component 1123 may be software components that are executed and run on processor 1109.

Figure 12:
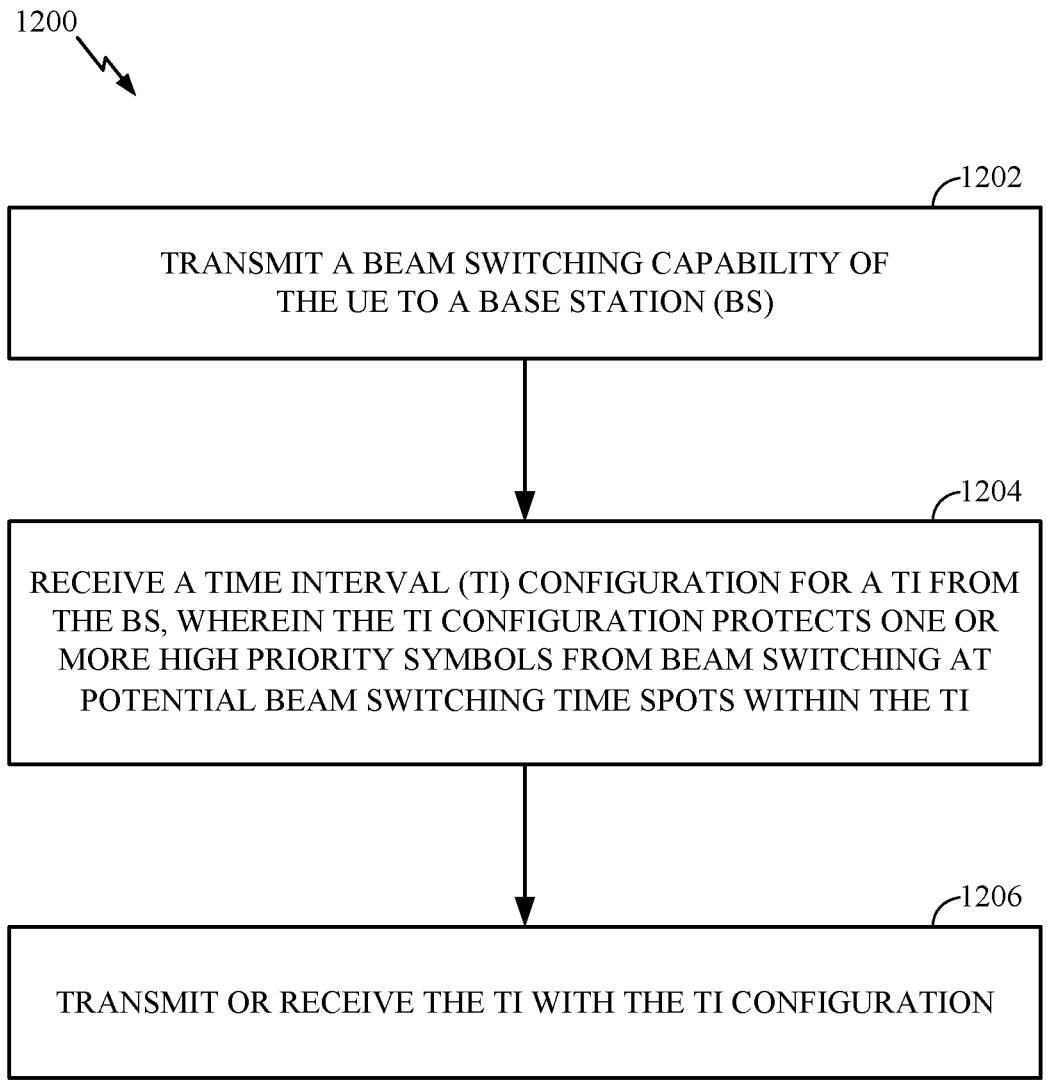
FIG. 12 illustrates example operations performed by a user equipment, according to aspects of the present disclosure.

FIG. 12 illustrates example operations 1200 performed by a user equipment (e.g., UE 120), according to aspects of the present disclosure.

Operations 1200 begin, at 1202, by transmitting a beam switching capability of the UE to a base station (BS). As described above, in some embodiments, the UE transmits an indication to the BS (e.g., BS 110) that is indicative of its beam switching capability. As a result, transmitting the beam switching capability of the UE to the BS enables the BS to determine whether certain steps (e.g., steps 1002-1006 of operations 1000) need to be taken in order to protect high priority symbols from the impact of beam switching.

At 1204, the UE receives a time interval configuration for a time interval from the BS, wherein the time interval configuration protects one or more high priority symbols from beam switching at potential beam switching time spots within the time interval. As described above, the time interval configuration may be determined such that a high priority symbol may not immediately follow and/or precede a potential beam switching time spot. In addition, as described above, in some embodiments, additional high priority symbols may be placed after one or more of the potential beam switching time spots in the time interval.

At 1206, the UE transmits or receives the time interval with the time interval configuration.

Figure 13:
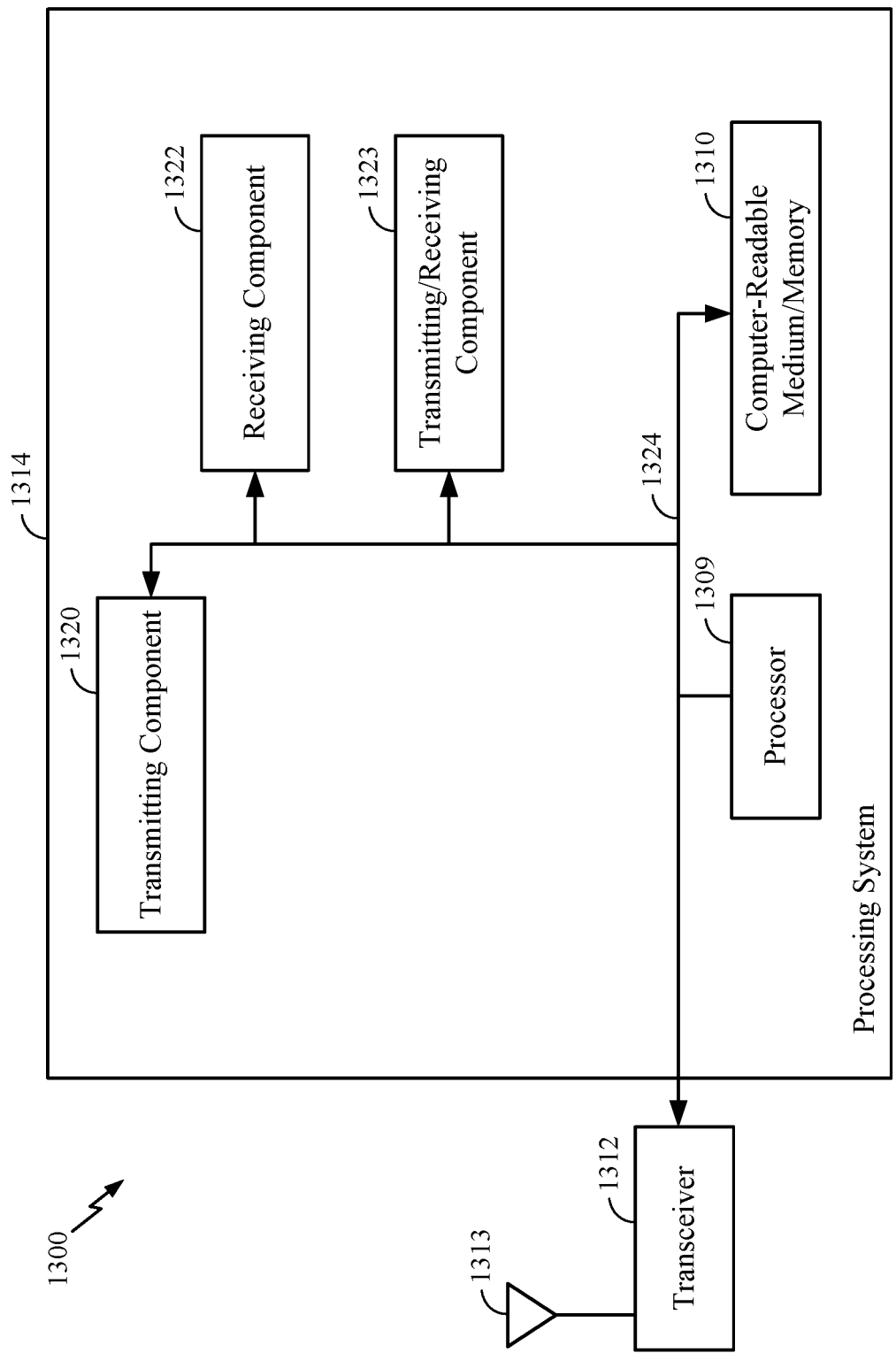
FIG. 13 illustrates a communications device that may include various components configured to perform operations for the techniques disclosed herein, such as one or more of the operations illustrated in FIG. 12.

FIG. 13 illustrates a communications device 1300 (i.e., BS 110) that may include various components (e.g., corresponding to means-plus-function components) configured to perform operations for the techniques disclosed herein, such as one or more of the operations illustrated in FIG. 12. The communications device 1300 includes a processing system 1314 coupled to a transceiver 1312. The transceiver 1312 is configured to transmit and receive signals for the communications device 1300 via an antenna 1313. The processing system 1314 may be configured to perform processing functions for the communications device 1300, such as processing signals, etc.

The processing system 1314 includes a processor 1309 coupled to a computer-readable medium/memory 1310 via a bus 1324. In certain aspects, the computer-readable medium/memory 1310 is configured to store instructions that when executed by processor 1309, cause the processor 1309 to perform one or more of the operations illustrated in FIG. 12, or other operations for performing the various techniques discussed herein.

In certain aspects, the processing system 1314 further includes a transmitting component 1320 for performing one or more of the operations illustrated at 1202 in FIG. 12. Additionally, the processing system 1314 includes a receiving component 1322 for performing one or more of the operations illustrated at 1204 in FIG. 12. Further, the processing system 1314 includes a transmitting/receiving component 1323 for performing one or more of the operations illustrated at 1206 in FIG. 12.

The transmitting component 1320, the receiving component 1322, and the transmitting/receiving component 1323 may be coupled to the processor 1309 via bus 1324. In certain aspects, the transmitting component 1320, the receiving component 1322, and the transmitting/receiving component 1323 may be hardware circuits. In certain aspects, the transmitting component 1320, the receiving component 1322, and the transmitting/receiving component 1323 may be software components that are executed and run on processor 1309.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications for use by a base station, comprising:
    identifying potential beam switching time spots within a time interval;
    determining a time interval configuration of the time interval based on the identified potential beam switching time spots, wherein the time interval configuration protects one or more high priority symbols from beam switching at the potential beam switching time spots within the time interval; and
    transmitting the time interval configuration to a user equipment (UE).

2. The method of claim 1, wherein determining the time interval configuration further comprises:
    determining priority of symbols scheduled for transmission in the time interval.

3. The method of claim 2, wherein determining priority of symbols further comprises:
    identifying a number of high priority symbols among the symbols scheduled for transmission in the time interval, the number of high priority symbols including the one or more high priority symbols.

4. The method of claim 1, wherein the time interval configuration protects the one or more high priority symbols by causing the base station to refrain from placing the one or more high priority symbols immediately after one or more of the potential beam switching time spots.

5. The method of claim 1, wherein the time interval configuration protects the one or more high priority symbols by causing the base station to:
    refrain from placing the one or more of high priority symbols immediately before and immediately after one or more of the potential beam switching time spots.

6. The method of claim 1, wherein the time interval configuration protects the one or more high priority symbols by causing the base station to:
    place one or more additional high priority symbols after the potential beam switching time spots in the time interval, wherein the one or more additional high priority symbols are copies of the one or more high priority symbols.

7. The method of claim 1, wherein the one or more high priority symbols comprise at least one of a demodulation reference signal (DMRS) or channel state information reference signals (CSI-RS).

8. The method of claim 1, further comprising:
    receiving, from the UE, a beam switching capability of the UE, wherein determining the time interval configuration of the time interval additionally depends on the beam switch capability of the UE.

9. The method of claim 1, wherein transmitting the time interval configuration further comprises transmitting the time interval configuration in a signaling, wherein the signaling includes at least one of a downlink control information (DCI) signaling, radio resource control (RRC) signaling, or a media access control element (MAC-CE) signaling.

10. The method of claim 1, further comprising:
    transmitting or receiving the time interval with the time interval configuration.

11. The method of claim 1, wherein the beam switching at the potential beam switching time spots comprises a change of a transmission configuration indicator (TCI) beam.

12. The method of claim 1, wherein determining the time interval configuration further comprises:
selecting the time interval configuration from a number of time interval configurations, wherein the time interval configuration protects the one or more high priority symbols by causing the bases station to refrain from placing the one or more high priority symbols immediately following or preceding one or more of the potential beam switching time spots in the time interval.

13. The method of claim 1, wherein determining the time interval configuration further comprises:
selecting the time interval configuration from a number of time interval configurations, wherein the time interval configuration protects the one or more high priority symbols by causing the bases station place one or more additional high priority symbols after one or more of the potential beam switching time spots in the time interval.

14. The method of claim 1, wherein determining the time interval configuration further comprises:
selecting the time interval configuration from a number of time interval configurations, wherein the time interval configuration protects the one or more high priority symbols by causing the bases station place one or more gap periods before or after one or more of the potential beam switching time spots in the time interval.

15. The method of claim 1, wherein determining the time interval configuration is at least in part based on a cyclic prefix (CP) length of a symbol in the time interval.

16. The method of claim 15, wherein receiving the time interval configuration further comprises receiving the time interval configuration in a signaling, wherein the signaling includes at least one of a downlink control information (DCI) signaling, radio resource control (RRC) signaling, or a media access control element (MAC-CE) signaling.

17. A method of wireless communications for use by a user equipment (UE), comprising:
transmitting a beam switching capability of the UE to a base station (BS);
receiving a time interval configuration for a time interval from the BS, wherein the time interval configuration protects one or more high priority symbols from beam switching at potential beam switching time spots within the time interval; and
transmitting or receiving the time interval with the time interval configuration.

18. The method of claim 17, wherein the time interval configuration indicates that the one or more high priority symbols are not placed immediately after one or more of the potential beam switching time spots within the time interval.

19. The method of claim 17, wherein the time interval configuration indicates that the one or more high priority symbols are not placed immediately before and immediately after one or more of the potential beam switching time spots within the time interval.

20. The method of claim 17, wherein the time interval configuration indicates that one or more additional high priority symbols are placed after the potential beam switching time spots in the time interval, wherein the one or more additional high priority symbols are copies of the one or more high priority symbols.

21. The method of claim 17, wherein the number of high priority symbols comprises at least one of a demodulation reference signal (DMRS) or channel state information reference signals (CSI-RS).

22. The method of claim 17, wherein the time interval configuration is determined by the BS based on the beam switching capability of the UE.

23. The method of claim 17, wherein the beam switching at the potential beam switching time spots comprises a change of a transmission configuration indicator (TCI) beam.

24. The method of claim 17, wherein according to the time interval configuration the one or more high priority symbols do not immediately follow or precede one or more of the potential beam switching time spots in the time interval.

25. The method of claim 17, wherein according to the time interval configuration one or more additional high priority symbols are placed after one or more of the potential beam switching time spots in the time interval.

26. The method of claim 17, wherein according to the time interval configuration one or more gap periods are placed before or after one or more of the potential beam switching time spots in the time interval.

27. An apparatus, comprising:
a non-transitory memory comprising executable instructions; and
a processor in data communication with the memory and configured to execute the instructions to cause the apparatus to:
identify potential beam switching time spots within a time interval;
determine a time interval configuration of the time interval based on the identified potential beam switching time spots, wherein the time interval configuration protects one or more high priority symbols from beam switching at the potential beam switching time spots within the time interval; and
transmit the time interval configuration to a user equipment (UE).

28. The apparatus of claim 27, wherein the processor being configured to cause the apparatus to determine the time interval configuration comprises the processor being configured to cause the apparatus to determine priority of symbols scheduled for transmission in the time interval.

29. An apparatus, comprising:
a non-transitory memory comprising executable instructions; and
a processor in data communication with the memory and configured to execute the instructions to cause the apparatus to:
transmit a beam switching capability of the apparatus to a base station (BS);
receive a time interval configuration for a time interval from the BS, wherein the time interval configuration protects one or more high priority symbols from beam switching at potential beam switching time spots within the time interval; and
transmit or receive the time interval with the time interval configuration.

30. The apparatus of claim 29, wherein the time interval configuration indicates that the one or more high priority symbols are not placed immediately after one or more of the potential beam switching time spots within the time interval.

* * * * *